United States Patent [19]

Forster et al.

[11] 4,284,311
[45] Aug. 18, 1981

[54] MECHANICAL CENTRAL BUFFER COUPLING FOR RAIL VEHICLES

[75] Inventors: Hilmar Forster; Klaus Ksienzyk, both of Wolfenbüttel, Fed. Rep. of Germany

[73] Assignee: Scharfenbergkupplung GmbH, Fed. Rep. of Germany

[21] Appl. No.: 105,017

[22] Filed: Dec. 19, 1979

[30] Foreign Application Priority Data

Dec. 20, 1978 [DE] Fed. Rep. of Germany ....... 2854962

[51] Int. Cl.³ .............................................. B60D 7/04
[52] U.S. Cl. ...................................... 339/10; 213/1.3; 339/40; 339/147 R
[58] Field of Search ................. 339/10, 48, 49 B, 147, 339/255 R, 40; 213/1.3, 1.6

[56] References Cited

U.S. PATENT DOCUMENTS

| | | | |
|---|---|---|---|
| 2,883,069 | 4/1959 | Candlin, Jr. et al. | 213/1.3 |
| 3,222,631 | 12/1965 | Cohen | 339/40 |
| 3,499,545 | 3/1970 | Cope et al. | 213/1.3 |
| 3,506,139 | 4/1970 | Cope et al. | 339/48 |

FOREIGN PATENT DOCUMENTS

| | | | |
|---|---|---|---|
| 2315569 | 2/1975 | Fed. Rep. of Germany | 339/40 |
| 1479487 | 5/1967 | France | 339/10 |

Primary Examiner—John McQuade
Attorney, Agent, or Firm—McGlew and Tuttle

[57] ABSTRACT

An electrical cable coupling, in particular for a mechanical buffer coupling of a rail vehicle, comprising first and second coupling heads each including a contact carrier with a recess therein. One of the coupling heads includes two spaced centering pins and the other of the coupling heads includes two spaced bushings into which the centering pins are engaged to center the coupling heads with each other. A photoconductor insert is detachably and resiliently mounted into each of the recesses. One of the inserts has a protruding portion which fits into a recessed portion of the other of the inserts. A spring-loaded photoconductor member is shiftably mounted in the protruding portion and aligned with a fixed photoconductor mounted in the recessed portion. The recessed portion is covered by a slotted gate structure which is movable by sword-shaped lugs on the other coupling head.

6 Claims, 3 Drawing Figures

MECHANICAL CENTRAL BUFFER COUPLING FOR RAIL VEHICLES

FIELD AND BACKGROUND OF THE INVENTION

The present invention relates in general to couplings, and in particular to a new and useful mechanical central buffer coupling for rail vehicles including electrical cable coupling heads.

To transmit pulses for controlling the brake and traction currents in a railroad train, it is known to provide plug or push contacts in the electrical cable coupling which is connected to a mechanical central buffer coupling. Since numerous contacts are needed for such a control, it becomes increasingly difficult to accommodate the contacts for the main system and the necessary auxiliary circuitry in the cable coupling heads within the predetermined space, because they must be appropriately spaced from each other to avoid creeping currents and flashovers.

SUMMARY OF THE INVENTION

The invention is directed to a minimization of the number of contacts by using photoconductors.

Accordingly, an object of the present invention is to provide an electrical cable coupling, in particular for a mechanical buffer coupling of a rail vehicle, comprising, first and second coupling heads each including a contact carrier with a recess therein, at least one centering pin connected to one of said first and second coupling heads and at least one bushing connected to the other of said coupling heads engageable with said centering pin when said coupling heads are coupled to each other, a photoconductor insert detachably secured in each of said recesses, an elastic lining in each of said recesses for resiliently supporting each of said inserts, one of said inserts having a protruding portion, the other of said inserts having a recessed portion for receiving said protruding portion, a spring-loaded photoconductor member in said protruding portion, a lug connected to and extending from said one of said inserts on one side of said protruding portion, the other of said inserts having a fixed photoconductor member extending from said recessed portion and alignable with said spring-loaded photoconductor member, and a slotted guard plate over said recessed portion movable by said lug when said coupling heads are coupled to expose said recessed portion to permit engagement of said protruding portion therein and engagement of said fixed photoconductor member with said spring-loaded photoconductor member.

A further object of the present invention is to provide an electrical cable coupling further including a cavity in the protruding portion of one of the inserts with a sliding gate at a front face of the insert, the recessed portion including a push pin extending therefrom and alignable with the cavity and engageable with the sliding gate to slide the gate when the coupling heads are coupled and expose the spring-loaded photoconductor member.

A further object of the present invention is to provide a mechanical central buffer coupling for rail vehicles which is simple in design, rugged in construction and economical to manufacture.

The various features of novelty which characterize the the invention are pointed out with particularlity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

One embodiment of the invention is diagrammatically shown in the drawing in which.

DESCRIPTION OF THE PREFERRED EMBODIMENT

Figure 2:
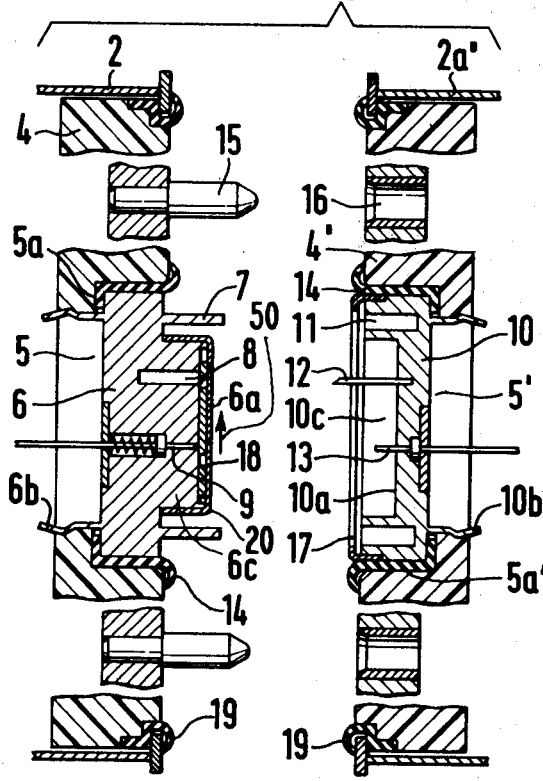
FIG. 2 is an enlarged sectional view taken along the line II—II of FIG. 1 showing, in addition, a mating opposite coupling head in the uncoupled position.

Turning to the drawings in particular, the invention embodied therein, comprises a mechanical central buffer coupling for rail vehicles 1 which includes on either side thereof coupling heads generally designated 2 and 2a which are adapted to engage in couple with coupling heads on another central buffer coupling, one example of which is shown in FIG. 2 at 2a'.

Figure 1:
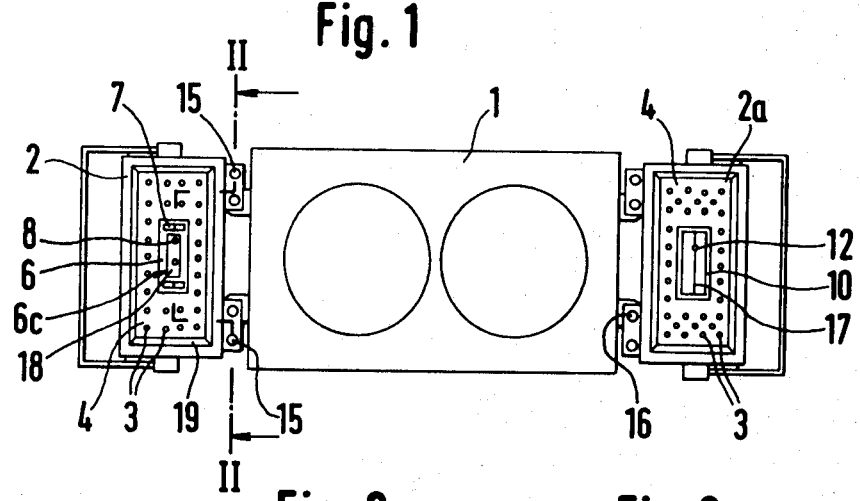
FIG. 1 is a front view of a mechanical coupling including cable coupling heads disposed on both sides thereof.
Figure 3:
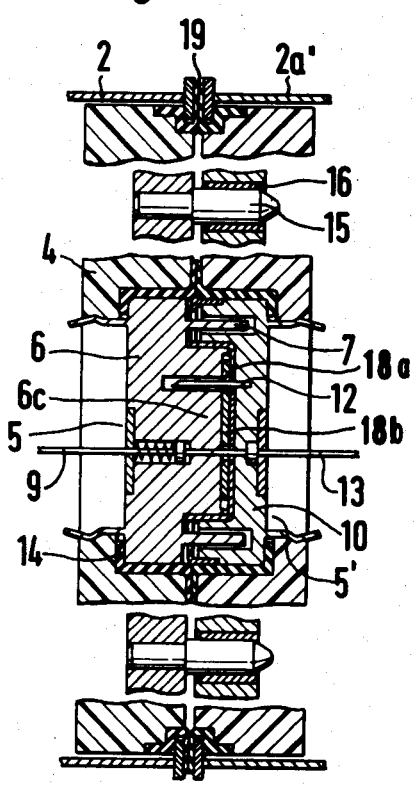
FIG. 3 shows the coupling heads of FIG. 2 in a coupled position.

On either side of the mechanical central buffer coupling 1, an axially displaceable cable coupling head 2, 2a is provided comprising a contact carrier 4 with a symmetrically disposed recess 5 which is surrounded by a plurality of contacts 3. A photoconductor insert 6 is received in the recess 5 of cable coupling head 2. Insert 6 protrudes from the face of contact carrier 4 by the insert front face 6a and supports sword-shaped lugs 7 which project from carrier 4 on either side of, and at locations spaced from, front face 6a while extending beyond the front face 6a. A cavity 8 is provided in the front face 6a of photoconductor insert 6 and the insert accommodates one or more spring-loaded photoconductors 9, as needed for the vehicles or cars to be connected to one another, At least one shiftable photoconductor 9 is necessary for the brake and traction current of each vehicle or car of the train. A photoconductor insert 10 is received in a recess 5' of cable coupling head 2a of FIG. 1 and of coupling head 2a' of FIGS. 2 and 3. In conformity with the provided disposition of front face 6a, the front face 10a of insert 10 is recessed. At locations spaced from front face 10a, insert 10 is provided with slots 11 corresponding to the length and shape of lugs 7. Insert 10 further carries a push pin 12 protruding beyond carrier 4' of head 2a' and accommodates a rigid photoconductor 13 which is aligned with photoconductor 9 and extends beyond front face 10a. Photoconductor inserts 6, 10 are conformable to each other as to their outer contours. Recesses 5 and 5' of contact carriers 4 and 4' are enlarged by two steps 5a and 5a', and the clearance between contact carriers 4 and 4' and photoconductor inserts 6 and 10 is each filled with a lining 14, so that, within small limits, inserts 6 and 10 is movable to all sides relative to contacts carriers 4 and 4'. Inserts 6 and 10 are positively fixed to and secured in contact carriers 4 and 4' by self-locking resilient elements 6b and 10b.

To mechanically connect cable coupling heads 2, 2a' to each other, they are brought into alignment by engaging centering pins 15 into corresponding bushings 16, which both are advantageously provided outside contact carrier 4, so that the associated contacts 3 meet each other. After centering pins 15 have penetrated into bushings 16 to a predetermined depth, a slotted guard plate 17 disposed in front of insert 10 and covering front face 10a while spaced apart therefrom, is shifted and slid aside by sword-shaped lugs 7 (in a direction in the plane of FIG. 1), which are wider than protruding portions 6c or front face 6a of insert 6, until recess 10c of insert 10 is cleared to receive protruding portion 6c. Plate 17 is shown in its position covering insert 10 in FIG. 1. At the same time and rate, a sliding gate 18 covering front face 6a is shifted aside by push pin 12 in the direction of arrow 50 whereby photoconductor 9 is exposed. To accomplish this pin 12 has angled end 12a which moves into angled opening 18a of gate 18 which moves gate 18 to align hole 18b of gate 18 with photoconductor 9. Gate 18 is retained by a cover plate 20 which has openings that are aligned with pin 12 on photoconductor 13. The penetration of element 7 and 12 into respective slots or cavities 11 and 8, during which inserts 6 and 10 can accommodate in position due to the elastic lining, brings photoconductors 9 and 13 into aligned contact whereupon the spring-backed photoconductor 9 is resiliently pushed back so that the front faces of the two photoconductors are pressed against each other. Contact carriers 4 and 4' are enclosed and protected against dirt penetration by elastic gaskets 19 extending along the periphery of cable coupling heads 2 and 2a' and photoconductor inserts 6 and 10 are similarly sealed in contact carrier 4 and lining 14.

While a specific embodiment of the invention has been shown and described in detail to illustrate the application of the principles of the invention, it will be understood that the invention may be embodied otherwise without departing from such principles.

What is claimed is:

1. An electrical cable coupling, in particular for a mechanical buffer coupling of a rail vehicle, comprising, first and second coupling heads each including a contact carrier having a recess therein, at least one centering pin connected to one of said first and second coupling heads and at least one bushing connected to the other of said coupling heads engageable with said centering pin when said coupling heads are coupled to each other, a photoconductor insert detachably secured in each of said recesses, an elastic lining in each of said recesses for resiliently supporting each of said inserts, one of said inserts having a protruding portion, the other of said inserts having a recessed portion for receiving said protruding portion, a spring-loaded photoconductor member in said protruding portion, a lug connected to and extending from said one of said inserts on one side of said protruding portion, the other of said inserts having a fixed photoconductor member extending from said recessed portion and alignable with said spring-loaded photoconductor member, and a slotted guide plate over said recessed portion movable by said lug when said coupling heads are coupled to expose said recessed portion to permit engagement of said protruding portion into said recessed portion and engagement of said fixed photoconductor member with said spring-loaded photoconductor member.

2. An electrical cable coupling according to claim 1 further including an elastic gasket on a border of each of said first and second coupling heads engageable with each other when said coupling heads are coupled to seal a space between said coupling heads.

3. An electrical cable coupling according to claim 1 wherein said protruding portion includes a cavity, a sliding gate on a front face of said protruding portion over said cavity and over said spring-loaded photoconductor member, said sliding gate including apertures for said cavity and said spring-loaded photoconductor member, a push pin extending from said recessed portion and engageable into said cavity when said coupling heads are coupled to move said sliding gate to expose said spring-loaded photoconductor member.

4. An electrical cable coupling according to claim 1 wherein said lug is sword-shaped and engages said slotted guard plate to slide said slotted guard plate to expose said recessed portion.

5. An electrical cable coupling according to claim 1 where each of said recesses in each of said contact carriers has a step against which each of said inserts rests, each of said inserts including at least one self-locking resilient element extending therefrom and engaged with said recesses to detachable secure each of said inserts into each of said recesses.

6. A mechanical central buffer coupling for rail vehicles, including electrical cable coupling heads which are provided on both sides thereof laterally of a vertical central plane, and which are mounted for axial displacement to establish connection and which have recessed areas for receiving concontacts and which are guided to alignment with the mating contact carriers of opposite coupling heads by means of centering pins engaging respective bushings, comprising a pair of contact carriers of a respective pair of cable coupling heads, a photoconductor insert detachably secured in a recess of each of said contact carriers, said recesses being enlarged by a step against which respective abutment portions of the photoconductor inserts apply through an elastic lining, one of said photoconductor inserts including a protruding portion in which a spring-backed photoconductor is accommodated and guided and a cavity is provided, and carries at least one sword-shaped lug extending on either side of and spaced from said protruding portion, with said protruding portion and lugs protruding from their contact carrier, the other of said photoconductor inserts including a recessed portion accommodating a fixed photoconductor and being recessed relative to its contact carrier in conformity with said protruding portion of the at least one of said photoconductor inserts in an uncoupled position, a pin extending from said recessed portion and alignable with said cavity, a front face of said at least one photoconductor inserts being covered with a sliding gate and the front face of the other photoconductor insert being covered with a slotted guard gate, said sword-shaped lugs moving said slotted guard plate and said pin moving said sliding gate and entering said cavity when said coupling heads are coupled.

* * * * *